INVENTOR.
JOHN K. MAGRANE
BY
ATTORNEY

United States Patent Office 3,346,432
Patented Oct. 10, 1967

3,346,432
SYNTHETIC PAPER OF IMPROVED FILM-FORMING CHARACTER AND ARTICLES PREPARED THEREFROM
John Kearns Magrane, Stamford, Conn., assignor to American Cyanamid Company, Stamford, Conn., a corporation of Maine
Filed Nov. 4, 1966, Ser. No. 600,323
10 Claims. (Cl. 156—330)

ABSTRACT OF THE DISCLOSURE

The invention resides in a filled web, which consists essentially of interfelted optically uniform fibrillated polyacrylonitrile fibers which have a uniform content of a transparent polymeric material having a flow point lower than the flow point of the fibers and a refractive index which matches the refractive index of the fibers. The polymeric material is present on the fibers in microglobular state, and sufficient is present so that it forms a continuous phase throughout the web when the web is hot-pressed at the flow point of the polymeric material. The web is made by adding the polymeric material as an emulsion to an aqueous suspension of wet-spun fibrillated wet-gel paper-making fibers, precipitating the emulsified polymer on the fibers in requisite amount, sheeting the suspension, and drying and uniformly collapsing the gel structure of the fibers.

---

Figure 2:
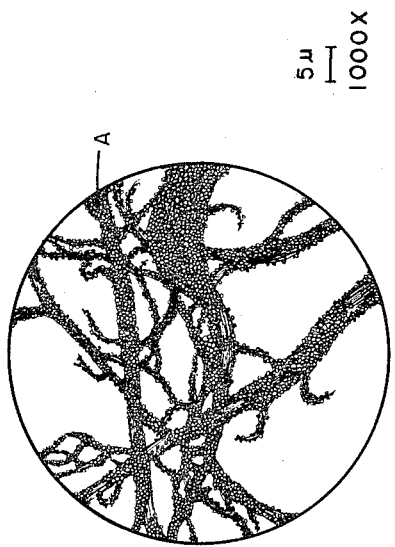

This is a continuation-in-part of my copending application Ser. No. 288,745 filed on June 18, 1963, and now abandoned.

The present invention relates to paper composed of optically uniform synthetic fibers carrying sufficient of a matching resin (or resin-forming composition) whereby a clear, transparent film is produced when the paper is hot-pressed. The invention includes the paper as such and in hot-pressed film state (with and without attached substrate) and includes the respective processes involved.

Wooding et al. U.S. Patent No. 2,784,135 of Mar. 5, 1957 discloses that polyacrylonitrile paper (i.e., paper composed of interfelted fibrillated polyacrylonitrile filaments), when hot-pressed, forms films which are transparent, flexible and strong.

The patent states that although it has not been tried, no reason is seen why the process cannot be applied to providing wood with a fused polyacrylonitrile filament coating.

According to the patent, the lowest pressures at which clear and flawless coatings were obtained were about 1500 lb./in.² At lower pressures, the coatings were cloudy or had a mottled, opaque appearance.

Recent laboratory trials have shown that when this procedure is applied to wood at pressures high enough to produce coatings which are uniformly clear, the wood undergoes loss of some of its most desirable properties because of the high compression to which it is subjected. I have found that the cores of the fibers employed are hollow, and that in that process, clear films are not produced until the air has been substantially completely displaced from the cores of the fibers.

The discovery has now been made that polyacrylonitrile paper yields flawless, water-clear and transparent films at pressures as low as 200–400 lb./in.² when the fibers of which the paper is composed are optically uniform and when they uniformly carry transparent fusible polymeric material of lower flow point and of matching refractive index in microglobular state, the amount of said polymeric material being sufficient to form a continuous phase through and over the paper when the paper is hot-pressed at the flow temperature of the polymeric material.

The reason why the presence of the polymeric material in microglobular state, as described, produces flawless films at such low pressures is not understood, but appears to be due to the ease with which the microglobules coalesce to form a continuous polymeric phase when the paper is hot-pressed. Evidently a continuous polymeric film forms which is in optical contact with the fibers and fibrils, and consequently substantially no air is present in inside or outside contact with the fibers.

Figure 1:
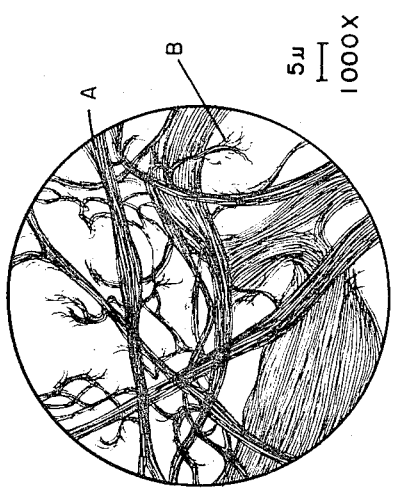

The invention is illustrated in the drawing, wherein:

FIG. 1 is a drawing (made from an electron photomicrograph at 1000×) of paper made from wet-spun, wet-gel polyacrylonitrile fibers which had been beaten to paper-making state at 1% consistency in aqueous suspension as shown in Wooding et al. U.S. Patent No. 2,810,646. A part of the suspension was made into paper which was drum-dried under a felt at 250° F. for 2 minutes to convert the fibers to collapsed state as shown in Magrane et al. U.S. Patent No. 3,264,170.

In FIG. 1, A represents typical paper-making fiber showing its striated structure, and B represents one of a group of fibrils which have split from such a striated fiber. The fibers and fibrils of this paper possess the irregularities characteristic of cellulose paper-making fibers.

FIG. 2 is a drawing made from an electron photomicrograph at 1000× of paper prepared in the same manner as the paper of FIG. 1, except that the fibrils substantially uniformly carry solid polymeric material of matching refractive index in the form of microglobules about 0.1 to 0.5μ in diameter. The paper was prepared by diluting the remaining suspension of FIG. 1 to 0.6% consistency with water, adding 3% (based on the dry weight of the fibers) of a water-soluble cationic retention aid, then adding 100% (based on the dry weight of the fibers) of a thermoplastic polymer as an anionic latex and forming the resulting suspension into paper which was likewise dried at 250° F. for two minutes. In the drawing, A designates a fiber substantially uniformly covered with microglobules of the polymer.

Figure 3:
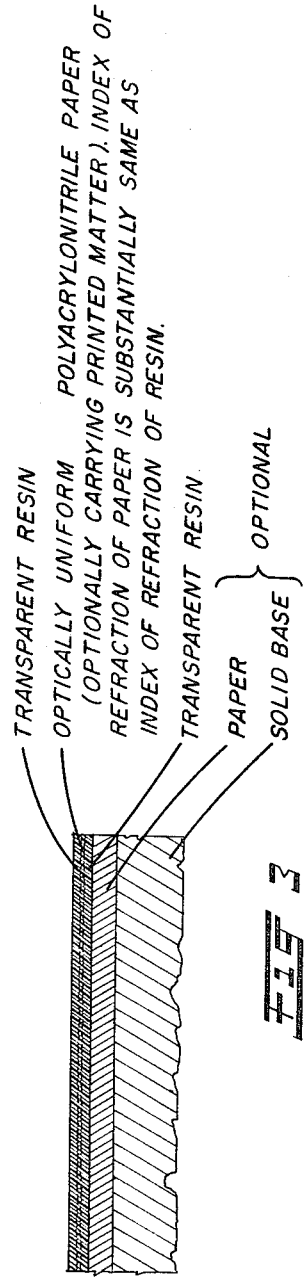

FIG. 3 is a schematic cross-section of paper composed of the fibers of FIG. 2 which has been hot-pressed upon a sheet of paper affixed to a solid base by an adhesive (not shown). The product of the hot-pressing is essentially a continuous clear transparent film of the polymeric material which covers and permeates the paper, thereby rendering it invisible.

The paper of the present invention is thus essentially a water-laid web of interfelted fibrillated polyacrylonitrile fibers which uniformly carries a matching transparent polymer in collodial microglobular state. The flow point of the polymer is less than the flow point of the fibers, and the amount of polymer is sufficient so that a continuous phase forms when the web is hot-pressed at the flow temperature of the polymer.

The paper of the present invention, in preferred embodiments, possesses the following advantages.

(1) The paper is dry, non-tacky, flexible and porous, and resembles ordinary paper in appearance and texture. It converts directly to a clear resinous film (either alone or as an adherent topcoat) without need for application of liquid or tacky polymeric materials.

(2) The polymeric material is so firmly attached to the fibers that it is not abraded off when the paper is subjected to rough handling, and the paper is flexible and strong. The paper can therefore be decorated by printing, stenciling, lithography, etc. on high-speed presses, and can be cut into shapes and formed into assemblies by automatic machinery.

(3) The paper does not shrink on storage and does not shrink with changes in relative humidity. The paper can therefore be cut into blanks which can be stored under ordinary plant conditions until needed.

(4) The paper when hot-pressed converts to a clear transparent film at low pressure. The resulting film is flexible, clear and transparent and adheres well to wood, cellulose paper, metal (including steel, copper and aluminum), cement-asbestos and other common substrate materials. The paper thus provides a simple and convenient method for applying transparent topcoat material to principal industrial substrates.

The paper of the present invention is made by forming an aqueous suspension of wet-spun fibrillated polyacrylonitrile paper-making fibers, adding to said suspension an emulsion of a transparent polymeric material which has a lower flow point than the flow point of the polymer of which the fibers are composed and which has a refractive index which matches the refractive index of the fibers, discretely precipitating the particles of polymeric material on said fibers in amount sufficient to form a continuous phase when the paper to be produced is hot-pressed at the polymer flow point, sheeting the suspension to form a web, and drying the web and collapsing the fibers.

The fibrous suspension is prepared by beating an aqueous suspension of chopped wet spun wet gel polyacrylonitrile filaments until the filaments have fibrillated sufficiently for paper-making purposes, as shown in said Wooding et al. patent.

Several methods are known for depositing the polymer in microglobular state on the fibers, and the invention does not depend on which method is selected. One reliable and therefore preferred method is the Bardac process [described in Casey, "Pulp and Paper," vol. 2, pp. 980–1 (2nd Ed., New York, 1960)] which is disclosed in detail in Wilson et al. U.S. Patent No. 2,563,897. According to this method cellulose paper-making fibers are rendered cationic by adsorption of melamineformaldehyde acid colloid, and an anionic emulsion of the desired impregnating agent is added at a neutral pH. Substantially complete deposition of the polymeric material in amounts up to 100% of the dry weight of the fibers can be achieved by this method.

The emulsified polymeric material is deposited uniformly on the fibers as microglobules, substantially as shown in FIG. 2, and the microglobules are in large measure retained by the fibers when the fibers are sheeted and dried. The process is applicable to fibrillated wet-spun fibrillated polyacrylonitrile fibers as shown in said Wooding et al. patent.

The anionic emulsions used in that process typically consist essentially of a continuous aqueous phase comprising an anionic emulsifying or dispersing agent and a dispersed phase comprising the polymeric material (which may be thermoplastic or thermosetting as desired). Emulsions of this description can be prepared by copolymerizing two or more than two suitable vinyl monomers in vigorously agitated aqueous medium containing an anionic emulsifying agent and a redox catalyst. The resulting polymers are thermoplastic when they contain no chemically reactive substituents.

Emulsions of thermosetting polymeric material are prepared by the copolymerization method just described wherein at least one of the copolymerizable monomers contain a secondarily reactive substituent and wherein a cross-linking agent is added to the emulsion which is capable of reacting with said secondarily reactive substituent. The amount of copolymerizable monomer containing a secondarily reactive substituent and the amount of cross-linking agent employed are sufficient so that an insoluble and infusible composition is produced when the components are heated.

A number of specific polymeric materials with their index of refraction are listed in the following table. Polymeric materials of intermediate indices of refraction can be prepared in known manner by mixing together two or more mutually soluble polymeric materials of different indices of refraction.

| Name: | Ref. Index |
|---|---|
| Poly(methyl methacrylate) | 1.49 |
| Methyl methacrylate:styrene (80:20) | 1.51 |
| Methylacrylate:benzyl methacrylate (66:34) | 1.51 |
| Nylon | 1.53 |
| Methyl methacrylate:styrene (55:45) | 1.54 |
| Polystyrene | 1.588 |

Other resins which have been used for the preparation of transparent overlay sheets are disclosed in Patterson et al. U.S. Patents 2,554,471 and 2,605,205.

The polyacrylonitrile paper referred to above may be entirely composed of polyacrylonitrile or may be a copolymer of a major amount of polyacrylonitrile with a minor amount of some other component copolymerizable therewith, for example, styrene, α-methylstyrene, vinyl acetate, methyl methacrylate, vinyl pyridine, dimethylaminoethyl acrylate, etc., the amount and identity of the minor components being such that the polymer in fiber state is strong, flexible, water-insoluble, and of desirably high softening point. Moreover, the polyacrylonitrile fiber may have a dissolved content of some other compatible polymer. For illustrations of such various fibers, see the Wooding et al. patent referred to above, Wooding et al. Patent No. 2,810,646; and U.S. Patents Nos. 3,047,455 and 3,047,456. Such fibers tolerate heating at 300° F. and in many instances may be heated to higher temperatures.

Suitable methods for uniformly collapsing the wet gel fibers and forming a dry web are disclosed in the Magrane et al. patent. Preferably this is done by heating the web of wet gel fibers at a temperature between about 200° F. and the fusion or decomposition point of the fibers under dimensional restraint in an atmosphere of high relative humidity which may be provided by an overlying thick felt. Regardless of the particular drying method which may be selected, the fibers which compose the dried web must be substantially free from air-filled cores or other inclusions of air and thus be substantially optically uniform.

It is a surprising feature of the process of the present invention that the resin microglobules preserve their discrete character even when the resin of which the microglobules is composed has a flow point below the temperature at which the paper is dried. In other words, I have found that the resin microglobules do not coalesce to a significant extent when the web is dried under normal paper-making conditions even when the flow point of the resin of which the microglobules are composed is below the paper drying temperature. As a result, the dry paper has the flexible, soft and porous structure which is characteristic of ordinary paper.

Whether or not the filaments of which the paper of the present invention is composed in any particular instance are well collapsed (so that they are optically uniform and free from inclusions of air) is readily determined by a laboratory trial. When the indices of refraction of the filaments and of the resin are the same, development of hazy areas in the film is ascribable to incomplete collapse of the fibers. Completeness of collapse may also be determined by examination of the filaments in section under an optical microscope, preferably after dyeing. Cores and pockets of air, when present, show up as white or lightly colored areas, and are evidence that the step of collapsing the gel structure of the fibers was not performed completely enough and that a higher temperature, a longer time, or a higher humidity should be provided.

The index of refraction of these fibers is generally in the range 1.49–1.55 [$n_D^{20}$] and is readily determined by standard methods including immersion in liquids of known refractive index.

The polymeric material which is present in the fibers of the paper of the present invention in microglobular state should be such that after the hot-pressing step it is transparent and its index of refraction matches the refractive index of the film sufficiently so that the fibers appear invisible. The match need not be exact, and a greater or less difference is tolerated from instance to instance depending on the appearance of the substrate. The polymer should likewise have a flow point below that of the polyacrylonitrile fibers so that the fibrous structure of the paper is not destroyed during the hot-pressing step. As a result, the paper is left in its original physical state so that it acts as a continuous reinforcing agent which makes the film tougher than would otherwise be the case.

The minimum amount of polymeric material needed so that a continuous phase forms when the paper is hot-pressed has not been determined. It may vary from instance to instance and can be determined by laboratory trial.

The paper of the present invention may be hot-pressed and converted to transparent film form upon any common surface to which resin-impregnated paper has been previously applied in the past, as for example, wood, plywood, Masonite (board made of compressed heat-bonded steam-exploded wood), asbestos-cement sheets, paper and metals. In general, one or more sheets of the paper are laid over the desired substrate and the assembly is hot-pressed.

The pressing element in contact with the paper may be a metal platen which advantageously carries a release coating to prevent adhesion of the polymeric material thereto.

The temperature and time of the pressing are correlated so that a clear and flawless coating is produced.

In general, the temperature of the pressing is at least that at which the thermoplastic resin used becomes soft. In the case of thermosetting resins, the minimum pressing temperature is that which is sufficient to produce the cure.

The duration of the pressing is sufficently long so that the globules of polymeric material fuse and form a continuous polymer phase within the paper. A number of methods for performing the pressing on different substrates are disclosed in Adams U.S. Patent No. 3,006,799 and may be used in the present instance.

The pressure employed should be that which produces a substantially flawless film, i.e. a film which contains no cloudy or opaque areas. Higher pressure than this may be employed, but on most substrates higher pressures produce no added useful results with respect to the film, and in the case of cellular substrates as, for example, woods, these pressures have the disadvantage of producing a crushing action which changes the properties of the wood.

Most structural organic cellular materials (for example wood, plywood, particle board and hardboard) and also cellulose paper, are not significantly harmed by pressures up to about 250 lb./in.$^2$ or 400 lb./in.$^2$ in some instances. It is a feature of the invention that polyacrylonitrile paper generally becomes transparent when hot-pressed within this range of pressures even at temperatures of 300°–350° F. which are entirely safe for use in connection with cellulose substrates.

In the specification and claims, the term "polymeric material" includes (1) pre-formed thermoplastic polymers and (2) mixtures of monomers or polymers which copolymerize at hot-pressing temperatures, and the term "emulsion" designates aqueous dispersions of normally solid materials.

The invention will be further described with reference to the examples, which are specific preferred embodiments of the invention and which are not to be construed as limitations thereon.

*Example 1*

The following illustrates the preparation of synthetic paper containing a thermoplastic transparent polymer of matching refractive index in collodial microglobular state.

An aqueous suspension of ⅜″ long wet-spun wet-gel thermoplastic polyacrylonitrile filaments composed of co-polymerized acrylonitrile [—CH$_2$—CH(CN)—] and methyl methacrylate [—CH$_2$—CH(CH$_3$)(COOCH$_3$)—] linkages in 90:10 weight ratio having an index of refraction [$n_D^{20}$] of 1.51 and a flow point (stick point method) of about 220° C. is beaten in a laboratory beater until the filaments have fibrillated to the point where they appear to be substantially the same as cellulose fibers which are ready for paper-making.

The suspension is adjusted to 1% fiber consistency by addition of water and its pH is adjusted to 4.5 by addition of HCl. There is then added 3% (resin solids based on the dry weight of the fibers) of the cationic thermosetting melamine-formaldehyde acid colloid of Maxwell U.S. Patent No. 2,986,489. There is then added sufficient of a 30% by weight aqueous anionic emulsion of a 80:20 by weight methyl methacrylate:styrene copolymer transparent thermoplastic polymer having a softening point of about 100° C. and an index of refraction of 1.51 to provide 150% of copolymer solids based on the dry weight of the fibers, and the suspension is stirred gently for a few minutes.

The suspension is sheeted on a laboratory handsheet machine to form handsheets. The wet webs are dried for two minutes on a rotary laboratory drum drier having a drum temperature of 125° C. During the drying, high humidity is provided by an overlying thick felt, as is shown in U.S. Patent No. 3,264,170. The basis weight of the dry handsheet is 70 lb. per 25″ x 40″/500 ream. Extraction of part of one of the sheets with acetone shows that the weight of copolymer in the paper is 75.5% of the dry weight of the fibers. When the fibers are dyed and sectioned and the sections are examined under a microscope, it is seen that the fibers have substantially no air-filled spacers, so that they are optically uniform.

The paper is a white, odorless, porous web resembling ordinary white blotting paper in appearance, texture, feel, and tensile strength. It can be cut and torn like blotting paper. The polymer microglobules are not removed by vigorous rubbing of the paper between the fingers.

*Example 2*

A portion of the paper of Example 1 is placed over a sheet of black cellulose paper and the assembly is pressed at 400 lb./in.$^2$ for 10 minutes at 170° C.–175° C. between polished steel platens which have been sprayed with a release agent (Release-a-Gen type H–15–1 made by General Mills Co.). The result is a black sheet of paper which carries a tightly-adherent, clear, transparent, glossy and flexible film.

Close inspection of the film shows that it is flawless. It is free from cloudy or opaque areas, and from snow-flake-like spots indicative of non-homogeneity or the presence of occluded air.

*Example 3*

The procedure of Example 2 is repeated except that the pressure of the platen is increased to 1100 lb./in.$^2$ and its temperature is decreased to 155° C. A product having a similar appearance is obtained.

*Example 4*

The procedure of Example 2 is repeated except that (a) plywood, (b) pine wood, (c) Masonite and (d) particle board are employed as the substrate materials in place of the black paper. After the pressing operation, the substrates appear to carry a film of hard, transparent, glossy varnish. The caliper of the plywood decreases from 5.9 mm. to 4.5 mm. as the result of the pressing. The caliper of the Masonite shows no decrease.

A portion of the plywood is immersed in acetone for five minutes at room temperature. All the polymer is extracted. The plywood is allowed to dry and then appears to be merely a piece of plywood carrying a sheet of opaque, white paper.

*Example 5*

The procedure of Example 2 is repeated except that the polymer-containing paper is hot-pressed directly upon a preheated 6″ x 6″ plate of untreated steel having a caliper of 3 mm. The resulting steel plate carries a film having the same appearance as the film of Example 2.

The procedure is repeated using (a) aluminum and (b) copper as the substrate material. Results are substantially the same. The metals have the appearance of being brilliantly lacquered.

*Example 6*

The following illustrates the preparation of synthetic paper containing a transparent resin of matched refractive index which is thermosetting.

The procedure of Example 1 is repeated, except that the methyl methacrylate-styrene copolymer emulsion is replaced by an equal amount of an aqueous anionic emulsion of a mixture of a methyl methacrylate-ethyl acrylate-methacrylic acid copolymer and a diepoxy cyclohexyl cyclohexanecarboxylic cross-linking agent therefor.

[This emulsion is prepared by copolymerizing methyl methacrylate, ethyl acrylate and methacrylic acid in 80:10:10 weight ratio in aqueous medium containing a redox catalyst and an anionic emulsifying agent and adding to the resulting latex with rapid stirring 30% (based on the weight of the copolymer) of 3,4-epoxy-6-methyl-cyclohexyl methyl 3,4 - epoxy-6-methylcyclohexanecarboxylate (sold as "Epoxide 201" by Union Carbide Chemicals Co.) which emulsifies. The acid substituents of the copolymer are secondarily reactive groups and react with the epoxy component when the paper is heated.]

The resulting paper resembles the paper of Example 1.

*Example 7*

A sheet of paper prepared according to Example 6 is placed over a sheet of plywood and is pressed for 10 minutes at a temperature of 190° C. under a pressure of 550 lb./in.$^2$. The two components of the microglobules inter-react to form a water-clear, transparent, insoluble and infusible film which contains the paper.

The resulting plywood resembles the coated plywood product of Example 4 except that the film is not affected by immersion in acetone followed by drying.

*Example 8*

The following illustrates the manufacture of imitation mahogany wood by use of the paper of Example 1.

Mahogany graining is reverse imprinted upon one side of the paper of Example 1 by application of a series of mahogany-colored printing inks of high hiding power, and the resulting sheet is placed (printed side down) upon a panel of Masonite ¼″ thick. The assembly is pressed for 10 minutes at a temperature of 170° C. under a pressure of 400 lb./in.$^2$.

The product appears to be a varnished panel of mahogany wood.

*Example 9*

The following illustrates another method of forming imitation wood according to the present invention.

A sheet of cellulose paper imprinted with the design of mahogany wood is placed (printed side up) over a sheet of kraft paper impregnated with a thermosetting phenolic resin. These are in turn placed (printed side up) over a piece of chipboard. A sheet of paper according to Example 1 is placed over the printed cellulose paper sheet, and the assembly is hot-pressed according to Example 8.

The product appears to be a flawlessly varnished panel of mahogany wood, and is closely similar in appearance to the product of Example 8.

*Example 10*

The procedure of Example 1 is repeated except that the paper is prepared from polyacrylonitrile filaments having an index of refraction of 1.52 composed of —$CH_2$—$CH(CN)$— and —$CH_2$—$CH(-OOC-CH_3)$— units in 94:6 weight ratio.

The resulting paper contains an 80:20 by weight methyl methacrylate-styrene copolymer in amount equal to 80.5% of the weight of the fibers. The paper is hot-pressed on plywood by the method of Example 2. Results are substantially the same.

*Example 11*

A sheet of paper according to Example 1 is pressed for 10 minutes at 175° C. and 1000 lb./in.$^2$ between polished steel platens which have been sprayed with a fluorocarbon release composition (S–122 Fluorocarbon Release Agent made by Miller Stevens & Co.).

The product is a transparent, glossy, flexible film having a caliper of about 3.5 mils. The film has excellent strength and snap.

*Example 12*

The following illustrates the coating of an organic cellular material (plywood) according to the present invention at a very low (200 lb./in.$^2$) pressure.

A sheet of polyacrylonitrile paper containing 75.5% by weight (based on the weight of the fibers) of 80:20 methyl methacrylate:styrene copolymer prepared according to Example 1 is placed upon a 6″ x 6″ panel of ¼″ walnut veneer plywood. Over this paper is placed first a sheet of a commercial release paper (paper possessing no adhesiveness for organic adhesives) and then three sheets of heavy kraft paper as cushioning and pressure-distributing material.

The assembly is then pressed for 10 minutes at 200 lb./in.$^2$ at 170° C.

The product is a plywood panel which is apparently brilliantly and flawlessly lacquered. The caliper of the panel does not undergo substantial change as a result of the pressing.

I claim:

1. A web consisting essentially of uniformly collapsed interfelted optically uniform fibrillated polyacrylonitrile fibers uniformly carrying transparent polymeric material of lower flow point and of matching refractive index in colloidal microglobular state, the amount of said polymeric material being sufficient to form a continuous phase when said web is hot-pressed at the flow point of said polymeric material.

2. A web according to claim 1 wherein the polymeric material is a thermoplastic polymer.

3. A web according to claim 1 wherein the polyacrylonitrile fibers are composed of —$CH_2$—$CH(CN)$— and $CH_2$—$C(CH_3)(COOCH_3)$— units in 9:1 weight ratio, the polymeric material is a thermoplastic polymer composed of —$CH_2$—$CH(C_6H_5)$— and

—$CH_2$—$C(CH_3)(COOCH_3)$— units, and the refractive index of said fibers and of said polymeric material are each about 1.51.

4. A web according to claim 1 wherein the polymeric material is thermosetting.

5. A web according to claim 1 wherein the polyacrylonitrile fibers are composed of —$CH_2$—$CH(CN)$— and —$CH_2$—$CH(CH_3)(COOCH_3)$— units in 9:1 weight ratio, and the polymeric material is a 70:30 by weight thermosetting mixture of a 80:10:10 by weight methyl methacrylate-ethyl acrylate-methacrylic acid copolymer and of 3,4-epoxy-6-methylcyclohexylmethyl 3,4-epoxy-6-methylcyclohexanecarboxylate.

6. A process of manufacturing a web composed of polyacrylonitrile fibers carrying polymeric material, which converts to a clear transparent film when hot-pressed at a temperature between the flow points of said fibers and said polymeric material, which comprises forming an aqueous suspension of wet-spun fibrillated wet gel paper-making polyacrylonitrile fibers, adding to said suspension a colloidal emulsion of a transparent polymeric material of matching refractive index, discretely precipitating said emulsified polymeric material on said fibers in amount sufficient to form a continuous phase when the web to be produced is hot-pressed at a temperature between the flow points of said polymeric material and said fibers, sheeting said suspension to form a web, and drying and uniformly collapsing the gel structure of said fibers at a temperature above 200° F.

7. A process according to claim 6 wherein the fibers are collapsed at a temperature above the flow point of the transparent polymeric material.

8. A process of forming a clear transparent film which comprises hot-pressing a web according to claim 1 at a temperature above the flow point of the polymeric material therein until said material has formed a continuous phase in said web.

9. A process of forming an adherent transparent coating upon an article, which comprises hot-pressing a web according to claim 1 upon said article at a temperature between the flow points of the polymeric material in said web and the fibers of said web until a continuous polymer phase forms in said web.

10. A process according to claim 9 wherein the article is cellulosic.

References Cited
UNITED STATES PATENTS

| | | | |
|---|---|---|---|
| 2,563,897 | 8/1951 | Wilson et al. | 161—261 X |
| 2,605,205 | 7/1952 | Patterson et al. | 161—409 X |
| 2,784,135 | 3/1957 | Wooding et al. | 161—249 X |
| 2,922,732 | 1/1960 | Hopkins et al. | 161—409 X |
| 3,264,170 | 8/1966 | Magrane et al. | 162—206 X |

EARL M. BERGERT, *Primary Examiner.*

J. P. MELOCHE, *Assistant Examiner.*